United States Patent
Ogino et al.

(10) Patent No.: US 6,804,454 B2
(45) Date of Patent: Oct. 12, 2004

(54) VIDEO SIGNAL TRANSMISSION METHOD, SUPERIMPOSED INFORMATION EXTRACTION METHOD, VIDEO SIGNAL OUTPUT DEVICE, VIDEO SIGNAL RECORDING DEVICE, AND VIDEO SIGNAL RECORDING MEDIUM

(75) Inventors: Akira Ogino, Chiba (JP); Nozomu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 09/927,561

(22) Filed: Aug. 10, 2001

(65) Prior Publication Data

US 2002/0028064 A1 Mar. 7, 2002

Related U.S. Application Data

(62) Division of application No. 08/984,518, filed on Dec. 3, 1997, now Pat. No. 6,356,705.

(30) Foreign Application Priority Data

Dec. 10, 1996 (JP) ............................................ P8-346785

(51) Int. Cl.[7] .............................................. H04N 5/91
(52) U.S. Cl. .......................................... 386/94; 386/95
(58) Field of Search ............................. 386/46, 94, 95; 380/201, 226, 268; 348/465

(56) References Cited

U.S. PATENT DOCUMENTS

| | | | | |
|---|---|---|---|---|
| 4,319,273 A | * | 3/1982 | Nossem | 380/226 |
| 4,866,735 A | * | 9/1989 | Mori et al. | 375/150 |
| 4,964,138 A | * | 10/1990 | Nease et al. | 375/141 |
| 5,418,853 A | * | 5/1995 | Kanota et al. | 386/94 |
| 5,825,968 A | * | 10/1998 | Nishigaki et al. | 386/94 |
| 5,862,300 A | * | 1/1999 | Yagasaki et al. | 386/94 |
| 6,058,243 A | | 5/2000 | Ogino et al. | 386/94 |
| 6,195,129 B1 | | 2/2001 | Ogino et al. | 348/469 |
| 6,263,153 B1 | | 7/2001 | Ogino et al. | 386/94 |

* cited by examiner

*Primary Examiner*—Huy Nguyen
(74) *Attorney, Agent, or Firm*—Jay H. Maioli

(57) ABSTRACT

The output device generates the PN code string every second chip interval with reference to the video sync signal, and spectrally spreads the additional information using this PN code string. The spectrally spread additional information is superimposed on the video signal every second chip interval and outputted. Upon receiving the video signal, in the recording device for recording the video signal on a recording medium, the video signal component is canceled each other between the video signal component in the chip interval on which the additional information is superimposed and the video signal component in the chip interval on which the additional information is not superimposed because of the correlation of the video signal in the horizontal direction, and only the additional information is extracted.

15 Claims, 12 Drawing Sheets

ANTI-DUPLICATION CONTROL SIGNAL SPECTRUM
BEFORE SPECTRAL SPREAD

ANTI-DUPLICATION CONTROL SIGNAL SPECTRUM
AFTER SPECTRAL SPREAD

SPECTRUM OF INFORMATION SIGNAL ON WHICH SS ANTI-DUPLICATION CONTROL SIGNAL IS SUPERIMPOSED

SIGNAL SPECTRUM AFTER SPECTRAL INVERSION SPREAD IN MEMORY DEVICE SIDE

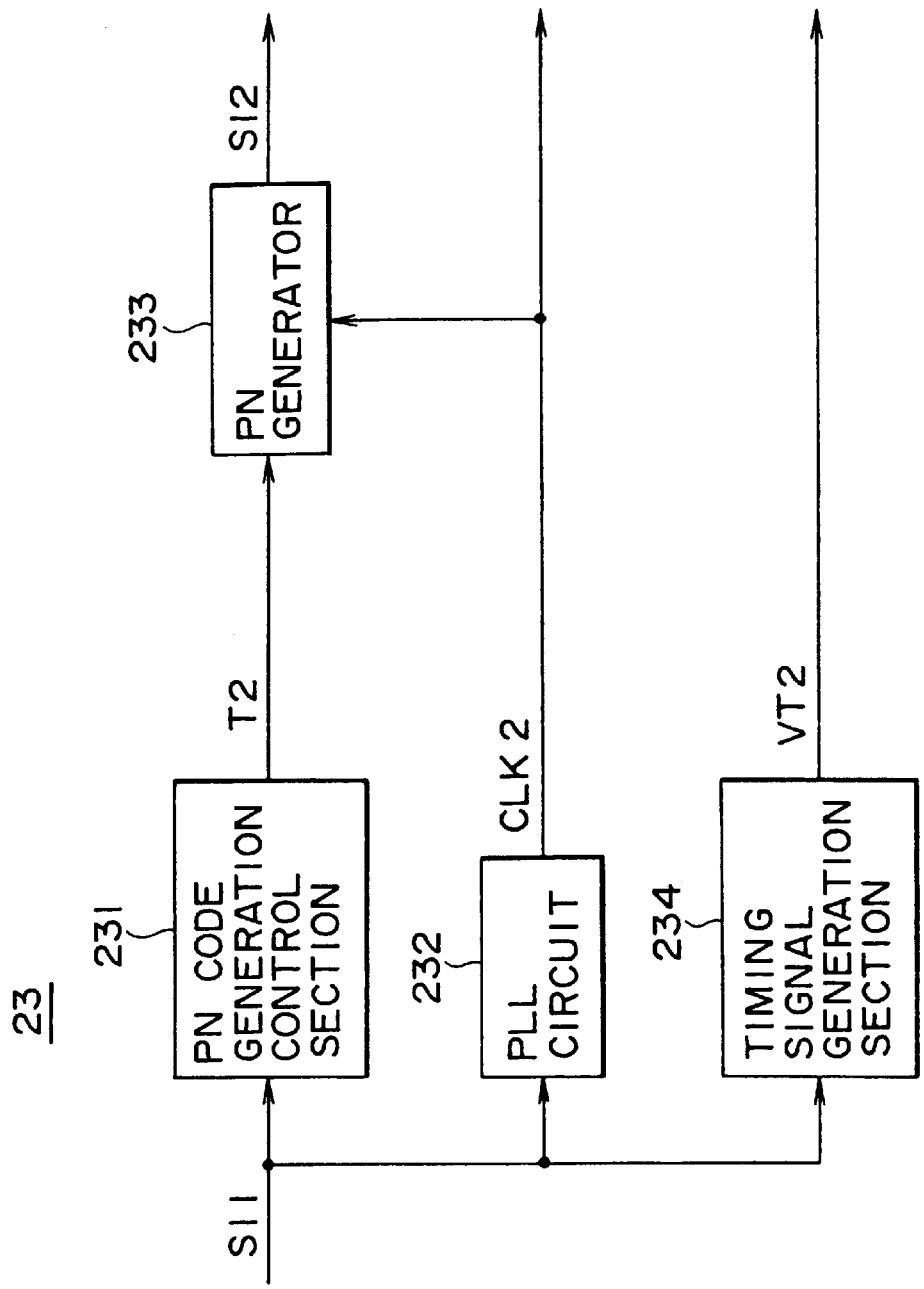

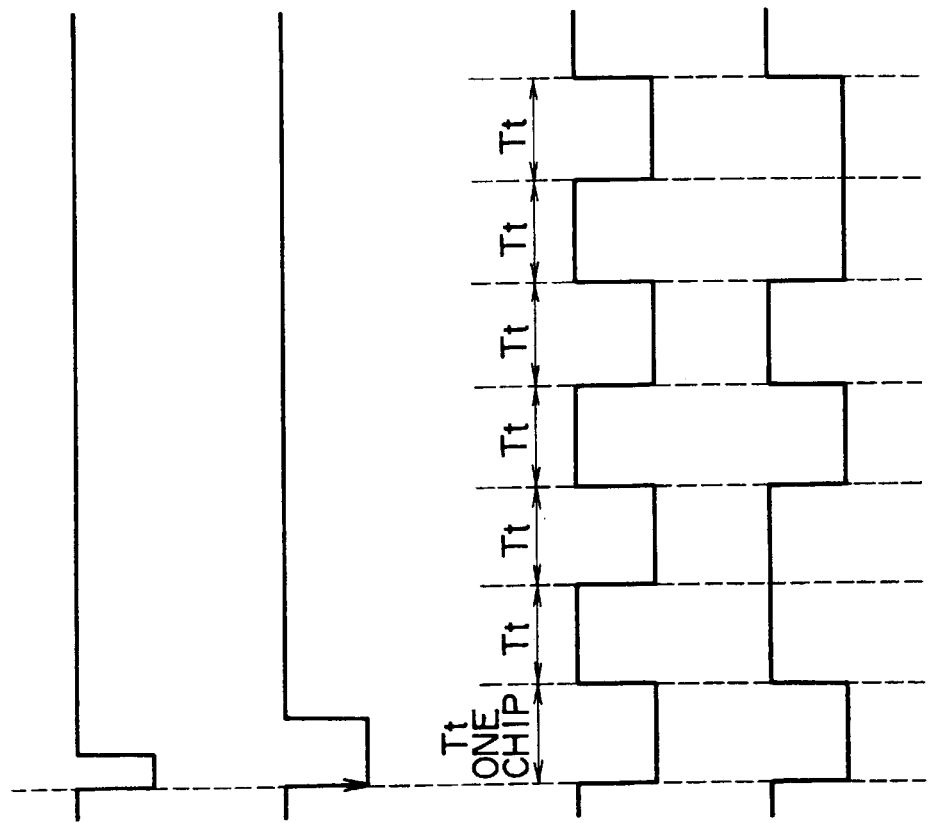
FIG. 8A VERTICAL SYNC SIGNAL
FIG. 8B PN CODE START TIMING SIGNAL T2
FIG. 8C PN CODE INVERSION CONTROL SIGNAL VT2
FIG. 8D PN INVERSION CODE S13

OUTPUT SIDE

RECORDING SIDE

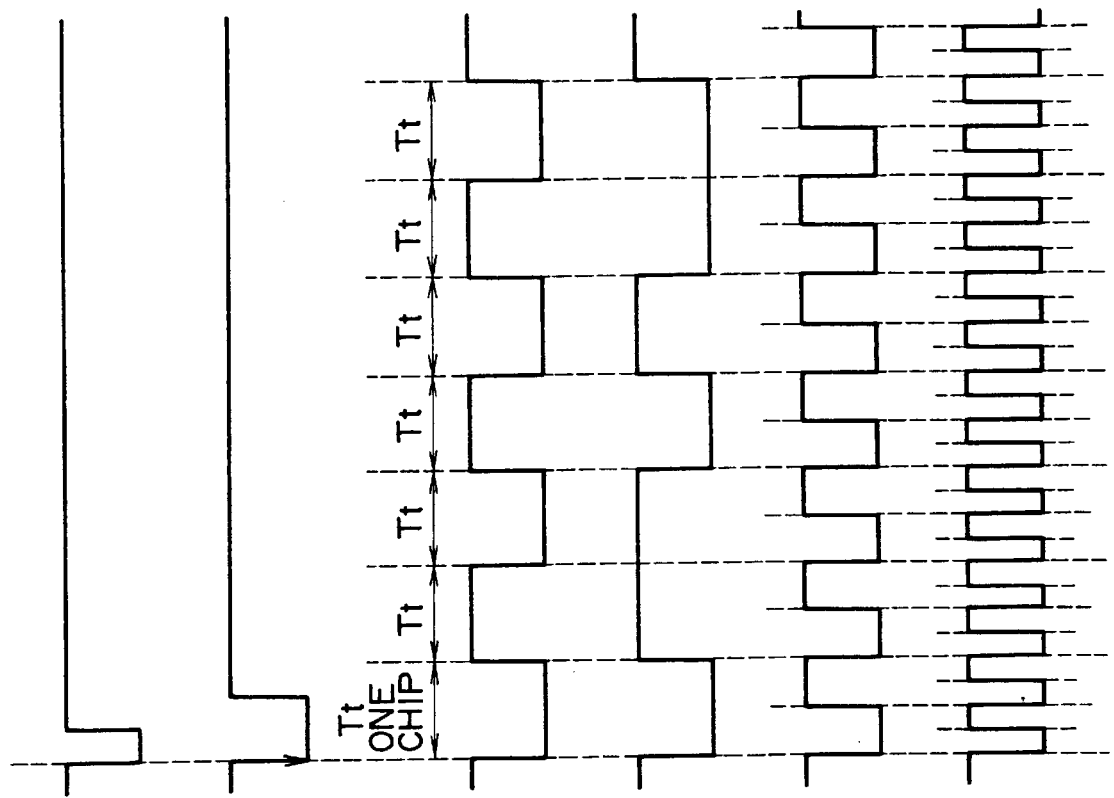

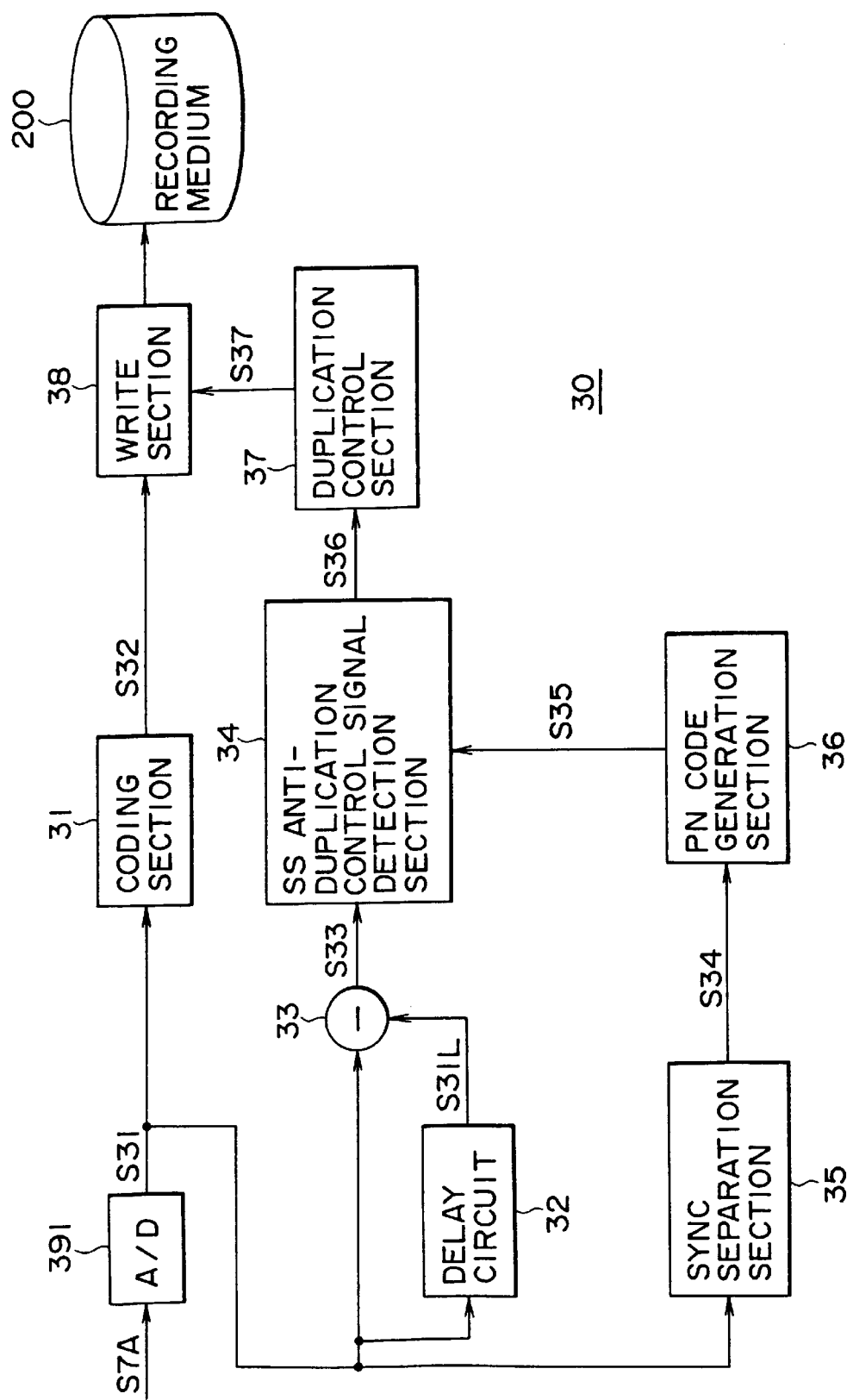

VIDEO SIGNAL TRANSMISSION METHOD, SUPERIMPOSED INFORMATION EXTRACTION METHOD, VIDEO SIGNAL OUTPUT DEVICE, VIDEO SIGNAL RECORDING DEVICE, AND VIDEO SIGNAL RECORDING MEDIUM

This is a division of prior application Ser. No. 08/984,518 on Dec. 3, 1997, U.S. Pat. No. 6,356,705.

BACKGROUND OF THE INVENTION

Field of the Invention

This invention relates to a method, device, and video signal recording medium which are capable of anti-duplication controlling, for example, in the case that a video signal recorded on a recording medium is played back and transmitted together with an information for preventing duplication, and the recording of the transmitted and received video signal on another recording medium is inhibited or restricted, by way of a method in which a video signal having the additional information superimposed thereon is outputted, the superimposed additional information is extracted from the received signal, and the extracted additional information is utilized to prevent duplication.

Description of the Related Art

VTR (Video Tape recording devices) has been popularized in daily life, and many kinds of software which can be played back on a VTR are supplied abundantly. Digital VTR or DVD (Digital Video Disks) playback devices have been available practically now, and provide images and sound of exceptionally high quality.

On the other hand, there is, however, a problem in that this great abundance of software can be copied without restriction, and several methods have already been proposed to inhibit duplication.

For example, for a VTR which outputs an analog video signal, one method to prevent copying uses a difference in the AGC (Automatic Gain Control) system, or in the APC (Automatic Phase Control) system, of the VTR recording device and of a monitor receiver for displaying the image.

When the method which utilizes the difference in AGC system, in which a VTR performs AGC using a pseudo sync signal inserted in the video signal and a monitor receiver employs a different AGC system not using the pseudo sync signal, is used, a very high level pseudo sync signal is inserted in the video signal supplied from the playback VTR and the video signal with insertion is outputted to the recording VTR as an AGC sync signal.

When the method which utilizes the difference in APC characteristics, in which a VTR performs APC using the phase of the color burst signal itself in the video signal and a monitor receiver employs an APC system different from that of the VTR, is used, the phase of the color burst of the video signal supplied from the playback VTR to the recording VTR is inverted partially.

As the result, the monitor receiver which receives the analog video signal from the playback VTR plays back the image correctly without being affected by the pseudo sync signal in AGC or the partial phase inversion of the color burst signal used for APC.

On the other hand, in a VTR, which is supplied with the analog video signal from the playback VTR into which pseudo sync signals have been inserted or which has been subjected to color burst signal phase inversion control as described herein above, for receiving such analog video signal and for recording the analog video signal on a recording medium, proper gain control or phase control based on the input signal cannot be performed, and so the video signal is not correctly recorded. Even if this signal is played back, therefore, normal picture and sound cannot be obtained.

In the case of a digitized video signal, for example, in a digital VTR, an anti-duplication signal or an anti-duplication control signal comprising, for example, a duplication ranking control code, is added as digital data to the video signal and recorded on the recording medium, so as to prevent or control duplication of the image.

In this case, the playback digital VTR reads the video signal, audio signal and anti-duplication control signal, and supplies them as digital or analog data to a recording digital VTR.

In the digital VTR being used as a recording device, the anti-duplication control signal is extracted from the supplied playback signal, and recording of the playback signal is then controlled based on the anti-duplication control signal. For example, when the anti-duplication control signal comprises an anti-duplication signal, the recording VTR does not perform recording.

Alternatively, when the anti-duplication control signal comprises a duplication ranking control code, recording is controlled by this ranking control code. For example, when the duplication ranking code limits duplication to one copy, the digital VTR used for recording adds this anti-duplication code before recording the video signal and audio signal on the recording medium as digital data. It is thereafter impossible to duplicate the video signal from the copy.

Hence, in the case of a digital connection when the video signal, the audio signal, and the anti-duplication control signal used as digital signals are supplied to the digital VTR used as a recording device, anti-duplication control is performed on the recording side using the anti-duplication control signal by supplying this signal to the digital VTR as digital data.

However, in the case of an analog connection where the video signal and audio signal are supplied as analog signals to a digital VTR used as a recording device (the digital VTR performs A/D conversion), D/A conversion of a signal to be supplied to the recording device causes the loss of the anti-duplication control signal because the anti-duplication control signal is not superimposed on the analog information signal such as a video signal and audio signal. Hence, in the case of an analog connection, an anti-duplication control signal must be added to the D/A converted image or sound signal, and this addition causes deterioration of the video signal and audio signal.

It is, therefore, difficult to add an anti-duplication control signal and to extract it in the recorder for the purpose of anti-duplication control, without causing deterioration of the D/A converted video signal or audio signal.

Conventionally, therefore, in the case of an analog connection, duplication was prevented by an anti-duplication method using a difference in the AGC, or a difference in APC characteristics, between the VTR and the monitor receiver.

However, in some cases, when anti-duplication is prevented using the above-mentioned difference in the AGC or a difference in APC characteristics between the VTR and the monitor receiver, depending on the type of AGC or APC characteristics in the recording side, the video signal may nevertheless be correctly recorded, in this case, it might happen that duplication cannot be prevented, or that the reproduced image on the monitor receiver is distorted. Further, it is troublesome to change over the anti-duplication method depending on whether there is an analog connection or a digital connection.

To solve such problem, an anti-duplication method in which a spectrally spread anti-duplication control signal is superimposed on a video signal is supposed to be useful as a method which can be used for both digital connections and analog connections without deterioration of the image or sound which is played back.

According to this method, a PN (Pseudorandom Noise) sequence code (referred to hereinafter as PN code) used as a spread code is generated with a sufficiently short period and spectrally spread by multiplying it by the anti-duplication control signal. In this way, a narrow-bandwidth high-level anti-duplication control signal is converted to a wide-band low-level signal which does not affect the video signal or sound signal. This spectrally spread anti-duplication control signal is then superimposed on the analog video signal, and recorded on a recording medium. In this case, the signal to be recorded on a recording medium may be an analog signal or a digital signal.

In the case that the recording medium does not carry a recorded video signal on which a spectrally spread anti-duplication control signal is superimposed but the recording medium carries a recorded video signal on which an anti-duplication control signal is recorded together with the video signal in the different other system, in the playback device, the anti-duplication control signal is extracted from the playback signal, spectrally spread, and superimposed on the video signal to be outputted.

On the other hand, in the recording device side, phase control is performed on the input video signal so that a PN code having the same generation timing and phase as those of the PN code used for spectrally spreading the anti-duplication control signal, and inversion spectral spreading is performed for extracting the original anti-duplication control signal by multiplying the video signal on which the spectrally spread anti-duplication control signal is superimposed by the PN code. Hence, the duplication prevention control is performed based on the anti-duplication control signal extracted by inversion spectral spreading.

In this way, the anti-duplication control signal is spectrally spread and superimposed on the video signal as a wide-band low-level signal. It is therefore difficult for a person who wishes to illegally duplicate the video signal, to remove the anti-duplication control signal which is superimposed on it.

However, it is possible to detect and use the superimposed anti-duplication control signal by inversion spectral spreading. This anti-duplication control signal is therefore supplied to the recording device together with the video signal. In the recording side, the anti-duplication control signal is detected, and duplication is consistently controlled according to the detected anti-duplication control signal.

According to this method, as described herein above, the spectrally spread anti-duplication control signal is superimposed as a wide band, low level signal on the video signal, but it must be superimposed at a lower S/N ratio than that of the video signal in order for the video signal not to cause deterioration of the video signal.

To superimpose the spectrally spread anti-duplication control signal at a lower S/N ratio than that of the video signal, and to be able to detect the anti-duplication control signal superimposed on the video signal in the recording device, the number of the PN codes (PN code length) required to spectrally spread a 1 bit anti-duplication control signal must be sufficiently large. The PN code length per bit of the anti-duplication control signal may also be expressed as a spread gain (spread factor) which is the ratio (T/TC) of a time width T per bit of the anti-duplication control signal to a time width TC of one part (one chip) of the PN code. As described hereinafter, this spread gain is obtained corresponding to the S/N ratio of the information signal on which the anti-duplication control signal is superimposed, in this case, corresponding to the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a lower level than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB (S/N ratio of 50 dB for video signal)+(S/N ratio of 10 dB necessary for detection) is required. In this case, the PN code length per bit of the anti-duplication control signal is 1 million code length.

In the case of a video signal on which a spectrally spread additional information is superimposed, spread gain can not be made small because of significant adverse effect of the superimposed additional information on the video signal and necessary S/N ratio required for extraction of the superimposed additional information.

To cope with this problem alternatively, if a large number of spread codes required for spectrally spreading an additional information per one bit is used, it takes a long time to perform inversion spectral spreading for extracting the spectrally spread additional information, and adequate control corresponding to the additional information superimposed on a video signal can not be performed.

For example, in the case of the anti-duplication control signal of inhibition of duplication, a video signal recording device which records a video signal until an anti-duplication control signal is detected completes recording of the supplied video signal before the anti-duplication control signal is detected.

Also in the case of the anti-duplication control signal of permission of duplication, a vide signal recording device which does not record a video signal until an anti-duplication control signal is detected will not record the video signal supplied before the anti-duplication control signal is detected.

In view of the above-mentioned problem, it is an object of the present invention to provide a method, device, and recording medium which are capable of extracting rapidly and correctly a spectrally spread anti-duplication control signal superimposed on a video signal to eliminate the above-mentioned problem.

SUMMARY OF THE INVENTION

To solve the above-mentioned problem, the video signal transmission method in accordance with the present invention involves a video signal transmission method for transmitting a video signal on which a spectrally spread additional information is superimposed, wherein the spectrally spread additional information is superimposed on every second interval of the video signal interval which is correlative to the adjacent video signal interval and is composed of intervals in unit interval of N ($N \geq 1$) chips of the spread code used for spectral spread.

The superimposed information extraction method in accordance with the present invention involves a superimposed information extraction method for extracting the additional information from the video signal on which the spectrally spread additional information is superimposed every second interval of the video signal interval composed of intervals in unit interval of N (N≧1) chips of the spread code used for spectral spreading and correlative to adjacent video signal intervals, wherein the additional information superimposed on the video signal is extracted by performing inversion spectral spread using the same spread code as used for spectrally spreading the additional information for the interval on which the spectrally spread additional information is superimposed out of the video signal interval composed of intervals in unit interval of N chips of the spread code, and on the other hand, using the spread code having the opposite polarity to that of the spread code used for spectral spread for the interval on which the spectrally spread additional information is not superimposed out of the video signal interval composed of intervals in unit interval of N chips of the spread code.

The superimposed information extraction method in accordance with the present invention involves a superimposed additional information extraction method for extracting the additional information from the video signal on which the spectrally spread additional information is superimposed every second interval of the video signal interval composed of intervals in unit interval of N (N≧1) chips of the spread code used for spectral spreading and correlative to adjacent video signal intervals, wherein the spectrally spread additional information is extracted by inversion spectrally spreading the result of obtained difference between the interval on which the spectrally spread additional information is superimposed and the interval on which the spectrally spread additional information is not superimposed out of the video signal interval composed of intervals in unit interval of N chips of the spread code.

According to the video signal transmission method in accordance with the present invention, a spectrally spread additional information is superimposed, for example, every second chip of the spread code for spectrally spreading the additional information on the video signal and transmitted.

According to the superimposed information extracting method in accordance with the present invention, as described herein above dependently on the video signal on which the spectrally spread additional information is superimposed intermittently on the interval every second chip of the spread code, inversion spectral spread is performed using the same spread code as the spread code used for spectrally spreading the additional information for the chip interval on which the additional information is superimposed, and on the other hand, using the spread code having the opposite polarity to that of the spread code used for spectral spread for the chip interval on which the additional information is not superimposed. Herein, the chip interval means a video signal interval corresponding to a generation interval of one chip spread code.

While inversion spectral spreading, the video signal on which the spectrally spread additional information is superimposed every second chip is multiplied by the inversion spreading spread code having different polarity depending on the type of chip interval, namely the interval on which the additional information is superimposed and the interval on which the additional information is not superimposed as described herein above, and the resultant products are integrated, and the additional information superimposed on the video signal is thereby extracted.

When, the inversion spreading spread code is multiplied by the video signal on which the additional information is superimposed, thereby, the polarity of the video signal component in the video signal is inverted dependently on whether the addition information is superimposed on the video signal or not.

The video signal is a correlative signal between the adjacent video signal intervals in the horizontal interval. For example, correlation of the video signal is very high between the adjacent pixels in the horizontal interval or adjacent video signal interval (interval composed of a plurality of pixels) in the horizontal interval.

One chip of the spread code corresponds to, for example, one pixel, or a plurality of pixels, therefore, correlation of the video signal between the adjacent chip intervals is high. Hence, the video signal component of the adjacent chip intervals which have alternate polarity is canceled and offset by integration performed during inversion spectral spread.

As the result, the high level video signal component is canceled, and then the additional information spectrally spread and superimposed on the video signal can be extracted efficiently. Thus, the detection efficiency of the additional information is improved and the spread gain is reduced.

Further, according to the superimposed information extraction method in accordance with the present invention, for example, upon receiving supply of the video signal on which the spectrally spread additional information is superimposed intermittently every second chip as described herein above, the video signal of the chip interval on which the additional information is not superimposed is subtracted from the video signal of the chip interval on which the additional information is superimposed adjacent to the former chip interval to obtain the difference.

In this case, the video signal component of the adjacent chip intervals is canceled each other because the difference of the video signal is obtained between the adjacent chip intervals having high correlation. As the result, the additional information spectrally spread and superimposed on the video signal is extracted as the difference. The additional information component is subjected to inversion spectral spread using the same spread code as the spread code used for spectral spread, and the additional information spectrally spread and superimposed on the video signal is thereby extracted.

Also in this case, the additional information spectrally spread and superimposed on the video signal is detected efficiently and rapidly because the high level video signal component is canceled. Thus, the detection efficiency of the additional information is improved and spread gain is reduced.

BRIEF DESCRIPTION OF THE DRAWINGS

FIG. 7 is a block diagram for illustrating one example of the PN code generation section of the video signal recording device shown in FIG. 2.

FIG. 8 is a diagram for describing one example of the inversion spreading PN code string generated in the video signal recording device shown in FIG. 2.

FIG. 10 is a diagram for describing generation and stop timing of the PN code string in the video signal output device in accordance with the present invention.

FIG. 11 is a block diagram for describing another example of one embodiment of the video signal recording device to which the video signal reception device in accordance with the present invention is applied.

DETAILED DESCRIPTION OF THE PREFERRED EMBODIMENTS

One embodiment of a video signal transmission method, superimposed information extraction method, video signal output device, video signal recording device, and video signal recording medium will be described in detail hereinafter with reference to the drawings.

A video signal output device and video signal recording device which are formed by using a video signal reception device in accordance with the present invention both will be described hereinafter as devices which are applied to a recording/playback device (abbreviated to as DVD device hereinafter) of a DVD (digital video disk). For simplification, the audio signal system is omitted from description.

As will be described in detail hereinafter, in the video signal duplication control system comprising the video signal output system and video signal recording system of this embodiment described hereinafter, a PN (Pseudorandom Noise) sequence code (PN code) is used as a spread code, an anti-duplication control signal is spectrally spread and superimposed on a video signal as an additional information in the video signal output device, the superimposed signal is subjected to inversion spectral spread to extract the anti-duplication control signal in the video signal recording device, and the duplication control of this video signal is performed using this extracted anti-duplication control signal.

Figure 1:
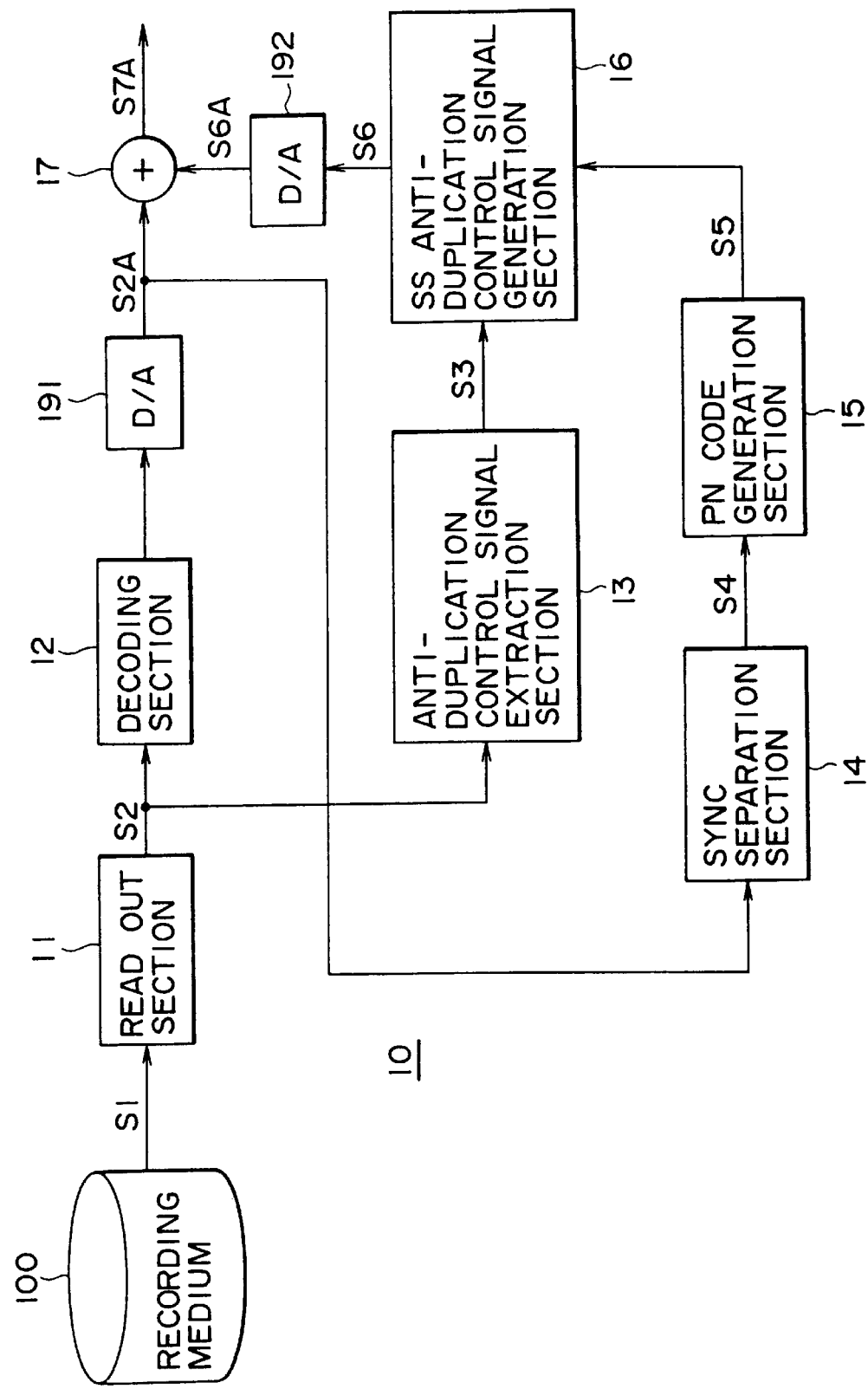
FIG. 1 is a block diagram for illustrating one embodiment of the video signal output device to which the video signal reception device in accordance with the present invention is applied.
Figure 2:
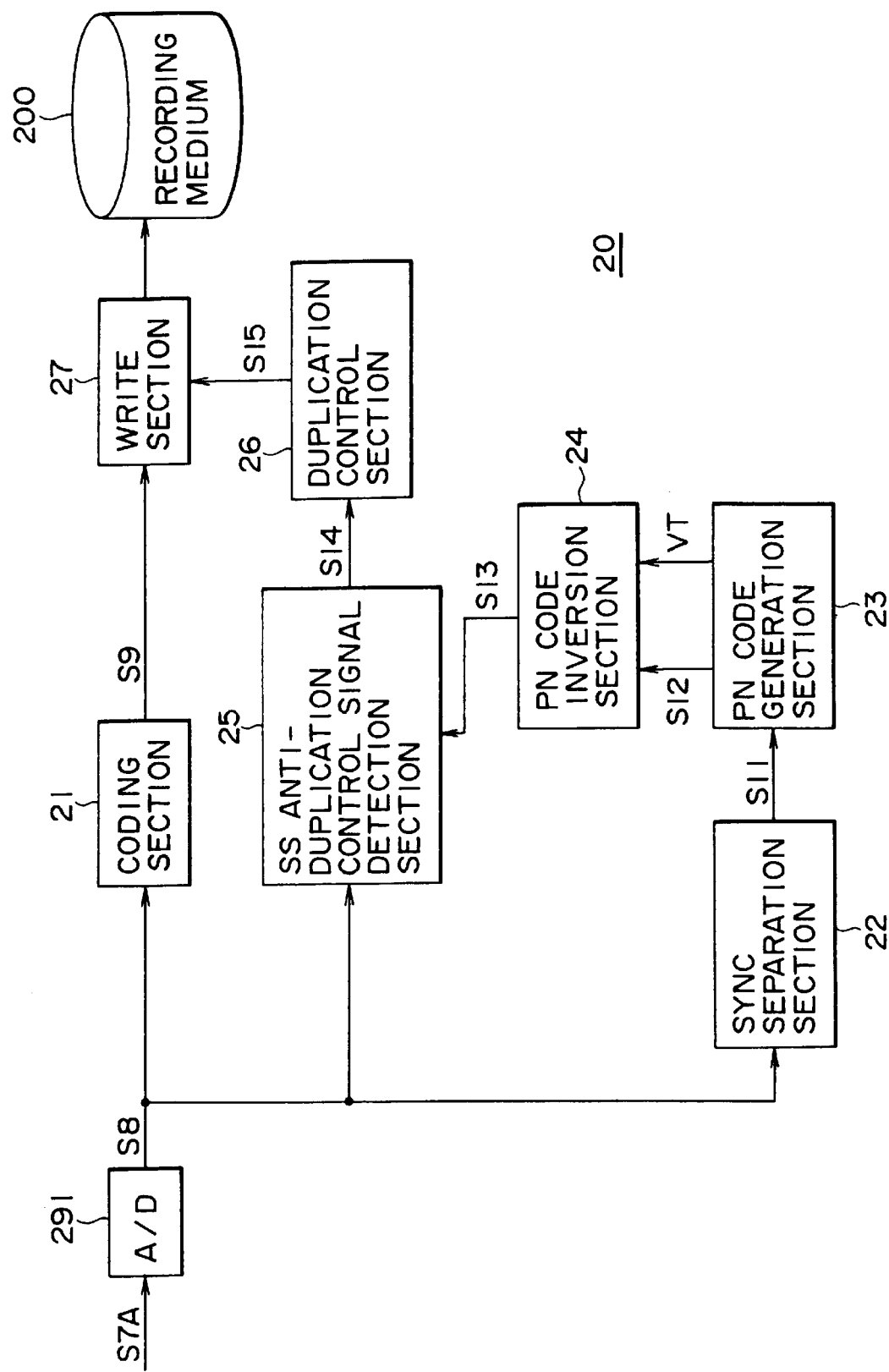
FIG. 2 is a block diagram for illustrating one embodiment of the video signal recording device in accordance with the present invention.

FIG. 1 and FIG. 2 are drawings for describing an image output device (referred to simply as output device hereinafter) 10 and an image recording device (referred to simply as recording device hereinafter) 20 used in an image anti-duplication control system according to this embodiment. In other words, the output device 10 corresponds to the output system of a DVD device, and the recording device 20 corresponds to the recording system of a DVD device.

In FIG. 1, on a recording medium 100, digitized images and audio signals are recorded together with an anti-duplication control signal as additional information. The recording medium 100 is a DVD in this embodiment. The anti-duplication control signal may be recorded on the innermost or outermost TOC or a track area known as the directory, or it may be inserted on a track in which image data or audio data is recorded, namely, on the area different from the data recording area. An example described hereinafter is of the latter case, namely that the case the anti-duplication control signal is read out at the same time as the video signal is read out.

In this embodiment, the anti-duplication control signal may be a signal for limiting the number of duplications such as a signal for permitting only the first duplication. To simplify the description in this embodiment, the anti-duplication control signal is a 1 bit signal for indicating inhibition or permission of a video signal duplication. For description, the anti-duplication control signal is described as a signal added in the video signal.

As shown in FIG. 1, the playback device 10 of this embodiment comprises a read-out section 11, decoding section 12, anti-duplication control signal extracting section 13, sync separation section 14, PN code generation section 15, spectrally spread anti-duplication control signal generation section 16 (referred to as SS (SS is an abbreviation of spectral spreading) anti-duplication control signal generating section hereinafter), addition section 17, and D/A conversion circuits 191, and 192.

The read-out unit 11 extracts a playback video signal component S2 from the signal S1 obtained by playing back the recording medium 100, and supplies it to the decoding section 12 and anti-duplication control signal extraction section 13.

The decoding section 12 demodulates the playback video signal component S2, generates a digital video signal, and supplies it to the D/A conversion circuit 191. The D/A conversion circuit 191 performs D/A conversion of the digital video signal to generate an analog video signal S2A comprising a sync signal, and supplies the result to the sync separation section 14 and addition section 17.

The anti-duplication control signal extraction section 13 extracts an anti-duplication control signal S3 added to the playback video signal component S2, and the extracted anti-duplication control signal S3 is supplied to the SS anti-duplication control signal generation section 16.

The sync separation section 14 removes a video sync signal S4 from the analog video signal S2A, and supplies the result to the PN code generation section 15. According to this embodiment, a horizontal sync signal is used as the video sync signal S4.

The PN code generator 15 generates a PN code (spread code) using the vertical sync signal S4 as a reference and forms various timing signals to be used in other processors. In detail, the PN code generation section 15 functions as a spread code generation means for generating a spread code for spectral spreading.

Figure 3:
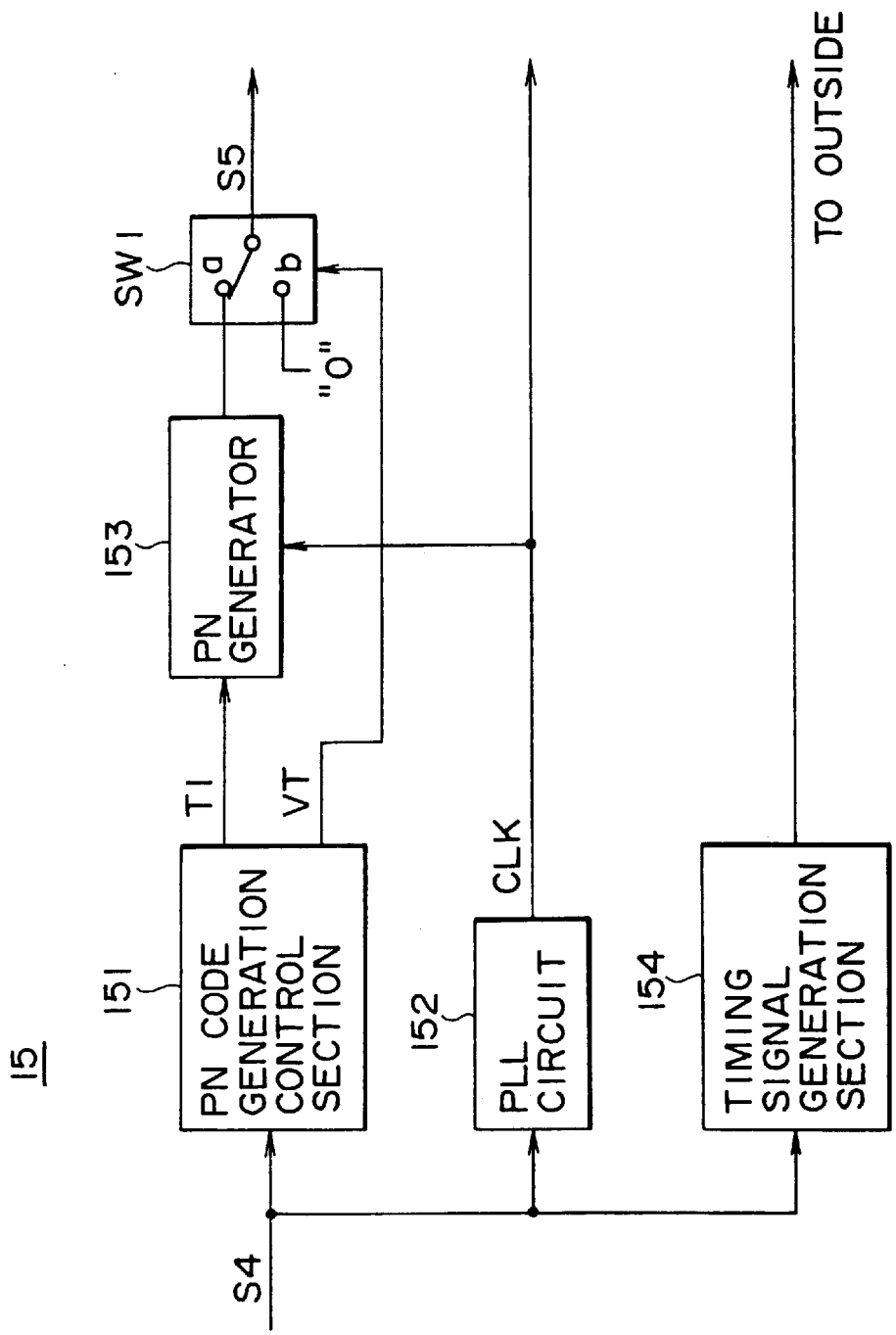
FIG. 3 is a block diagram for illustrating one example of the PN code generation section of the video signal output device shown in FIG. 1.
Figure 4:
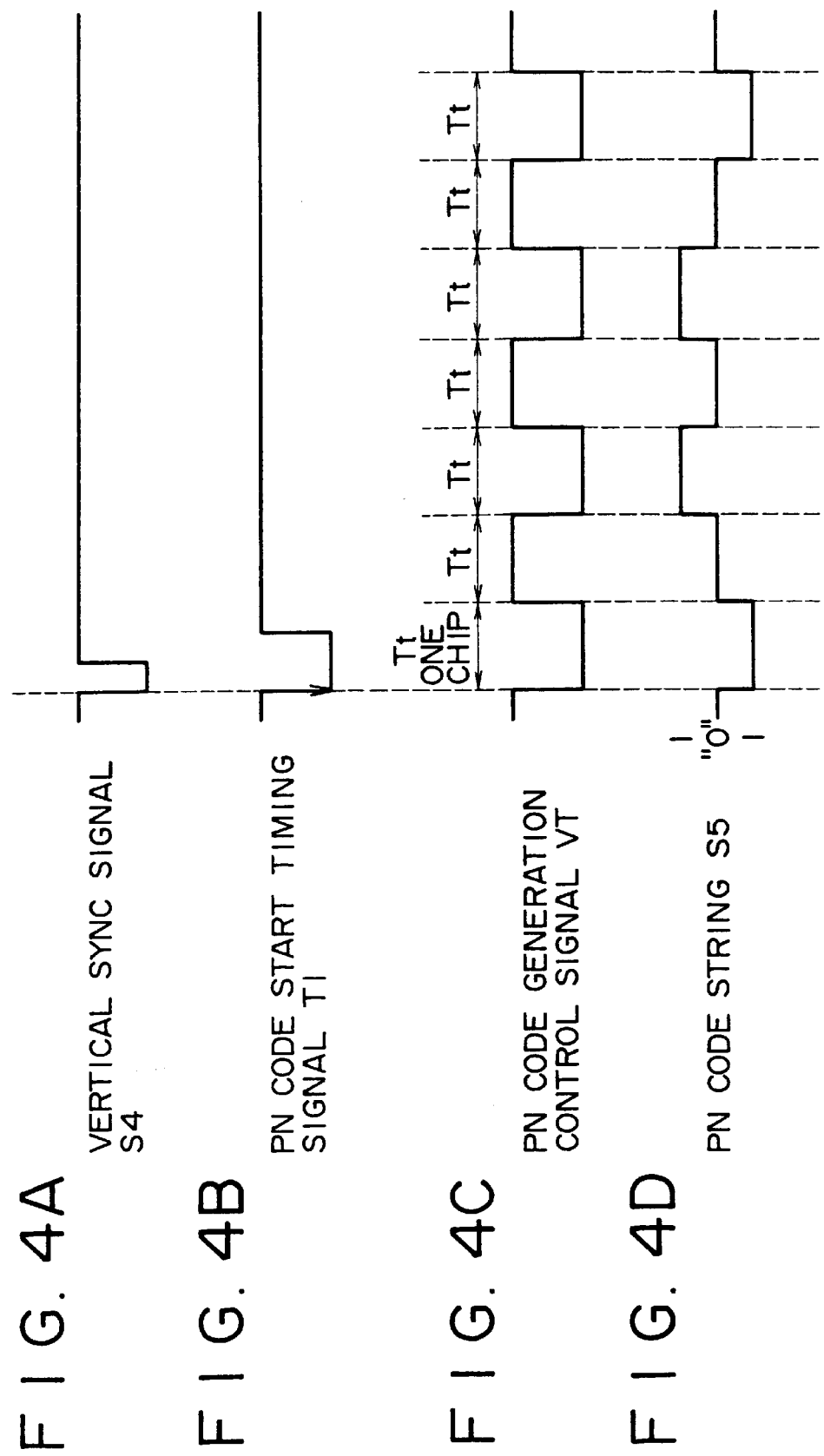
FIG. 4 is a diagram for describing one example of the PN code string generated in the video signal output device shown in FIG. 1.

FIG. 3 is a block diagram for describing the PN code generation section 15 of the output device 10 used in this embodiment. FIG. 4 is a diagram for describing a PN code string S5 generated in the PN code generating section 15.

As shown in FIG. 3, the PN code generation section 15 comprises a PN code generation control section 151, PLL circuit 152, PN code generator 153, and timing signal generation section 154. The horizontal sync signal S4 extracted in the sync separator 14 is supplied to the PN code generator 151 of the PN code generation section 15, the PLL circuit 152, and the timing signal generation section 154.

The PN code generation control section 151 generates an PN code start timing signal T1 (FIG. 4B) which indicates a timing for starting generation of a PN code string in synchronizing with the vertical sync signal S4 (FIG. 4A). In this embodiment, the PN code start timing signal T1 is generated with reference to the front edge of the vertical sync signal S4, and functions to start generation of a PN code string which repeats every one vertical interval.

The PN code generation control section 151 generates a PN code generation control signal VT (FIG. 4C) for indicating video signal intervals where PN code strings are to be generated and video signal intervals where PN code strings are not to be generated.

In this embodiment, the PN code generation control signal VT is a signal having a low level interval or high level interval which are alternating every one chip with reference to the front edge of the vertical sync signal S4 as shown in FIG. 4C. In detail, in this embodiment, as shown in FIG. 4C, the PN code generation control signal VT generates the PN code every second chip Tt, and the signal for controlling the switch circuit SW1 which will be described hereinafter.

The PN code start timing signal T1 generated in the PN code generation control section 151 is supplied to the PN code generator 153, and the PN code generation control signal VT is supplied to the switch circuit SW1.

The PLL circuit 152 generates a clock signal CLK based on the horizontal sync signal S4 supplied to it, and the clock signal is supplied to the PN code generator 153. The PLL circuit 152 in this embodiment generates a clock signal CLK having a frequency of, for example, 1 MHz as described hereinafter.

The PN code generator 153 determines PN code string generation start timing based on the PN code start timing signal T1, and also generates a PN code corresponding to the clock signal CLK, and supplied it to the input terminal of the switch circuit SW1.

Figure 5:
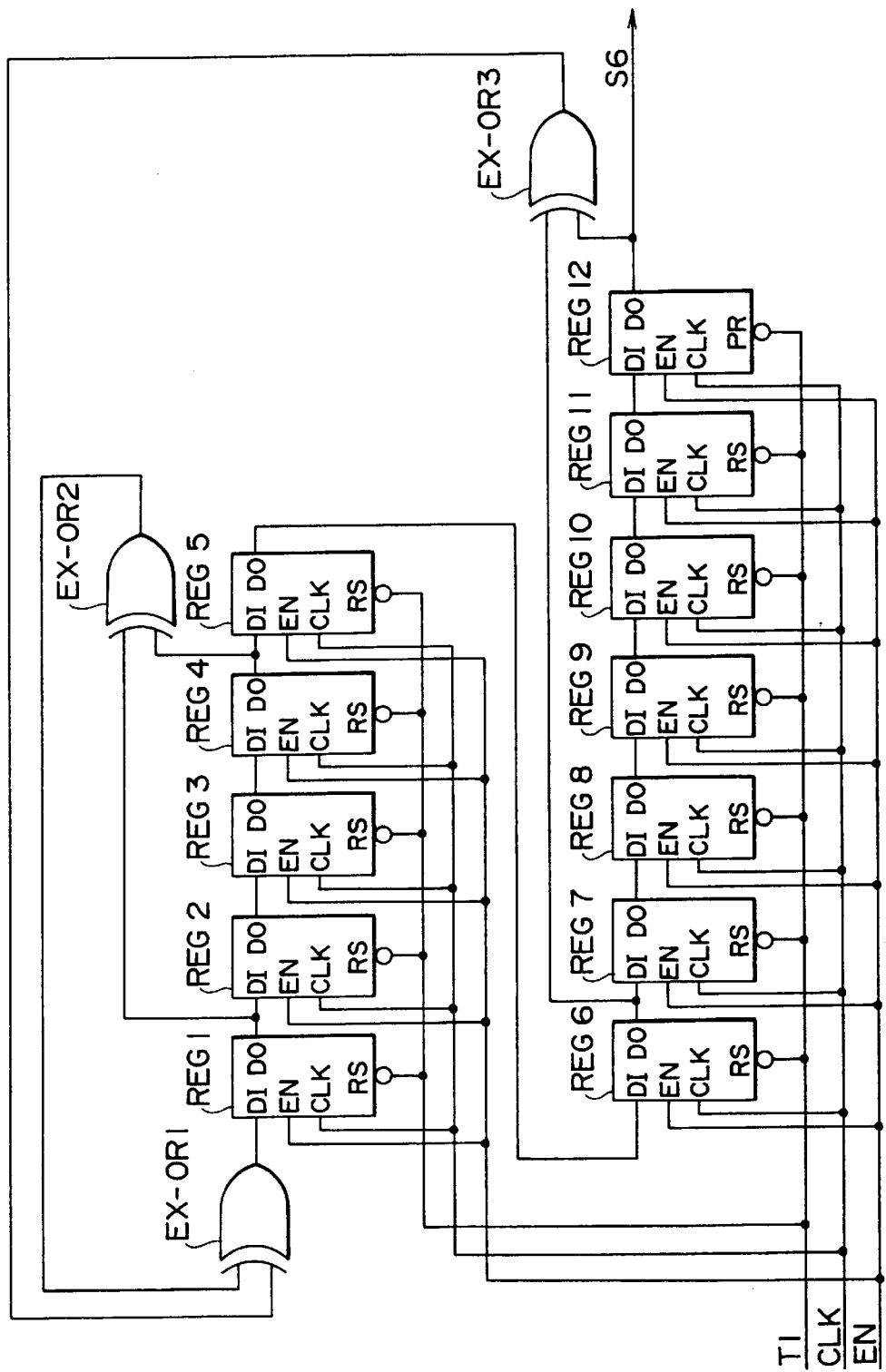
FIG. 5 is a diagram for describing one example of the PN code generator shown in FIG. 3.

FIG. 5 is a diagram for illustrating one example of the PN code generator 153. The PN code generator shown in FIG. 5 comprises 12 D-flip-flops REG1 to REG12 and three exclusive-OR circuits EX-OR1 to EX-OR3. As shown in FIG. 5, upon receiving supply of a PN code start timing signal T1 used as a reset signal, clock signal CLK, and enable signal EN, the PN code generator 153 in this example generates a PN code having 4095 chips per one vertical interval.

In this case as described hereinbefore, the clock rate of 250 kHz gives one period of a PN code string of 4095/250= 16.38 ms, and a PN code having 4095 chips is generated in an approximate one vertical interval (16.7 ms). By using the PN code start timing signal T1 as a reset signal, a PN code string having a pre-determined code pattern is generated from its head every one vertical interval. In other words, a PN code string which repeats every one vertical interval is generated.

In this embodiment, the PN code generator 153 generates M series codes which generate codes [1] and [0] randomly without deviation, and converts a generated code level [0] to [−1] to generate a PN code string composed of codes [1] and [−1].

The switch circuit SW1 is provided with two input terminals-a and -b as shown in FIG. 3. To the input terminal-a, the PN code string generated by the PN code generator 153 as described herein above is supplied, on the other hand, 0 level signal that is the median value of the PN code string composed of 1 and −1 is supplied to the other input terminal-b.

The switch SW1 is controlled correspondingly to the PN code generation control signal VT outputted from the PN code generation control section 151, switched to the input terminal-a side in the low level interval of a PN code generation control signal VT, and switched to the input terminal-b side in the high level interval of a PN code generation control signal VT.

From the switch circuit SW1 as shown in FIG. 4D, the PN code string is thereby outputted every one chip Tt, and 0 level signals are outputted in chip intervals on which a PN code string is not outputted, as the result, the PN code string S5 is generated. Herein, the chip interval means an interval corresponding to generation interval of one chip.

In detail, the switch SW1 outputs a PN code outputted from the PN code generator 153 in low level intervals of the PN code generation control signal VT and outputs a 0 level signal in high level intervals of the PN code generation control signal VT, thereby the PN code string is outputted intermittently every second chip with respect to the video signal. The PN code string S5 outputted from the switch circuit SW1 is supplied to the S5 anti-duplication control signal generation section 16.

The PN code string S5 shown in FIG. 4D is an example in which the PN code is generated successively as −1, 1, 1, −1 in the respective low level interval of the PN code generation control signal VT.

The timing signal generation section 154 generates various timing signals based on the vertical sync signal S4 and output it.

The SS anti-duplication control signal generation section 16 generates a spectrally spread anti-duplication control signal S6 by spectrally spreading the anti-duplication control signal using the PN code string S5, and supplies it to the D/A conversion circuit 192. The D/A conversion circuit 192 converts the spectrally spread signal S6 to an analog spectrally spread signal S6A and supplies it to the addition section 17.

The addition section 17 superimposes the analog spectrally spread signal S6A on the analog video signal S2A to generate an output video signal S7A, and outputs it. As described herein above, the addition section 17 functions as a superimposition means for superimposing a spectral spread signal S6A that is the anti-duplication control signal spectrally spread using the PN code string S5.

The analog output video signal S7A on which the spectrally spread anti-duplication control signal is superimposed is supplied to a monitor receiver for displaying a video image or a recording device 20 which will be described hereinafter.

In this case, the PN code string S5 is generated so as to generate the PN code every second chip, and then the anti-duplication control signal spectrally spread using this PN code string S5 is superimposed on the video signal every second chip and outputted.

FIG. 6 shows a relation between the anti-duplication control signal and main information signal, which is the video signal in this example, in the form of spectrum. The anti-duplication control signal contains not so much information, and is a low bit rate signal having a narrow band as shown in FIG. 6A. The anti-duplication control signal is changed by performing spectral spreading to a signal having a wide band as shown in FIG. 6B. When, the spectral spread signal level becomes low in inverse proportion to the enlargement ratio of the band.

Figure 6A:
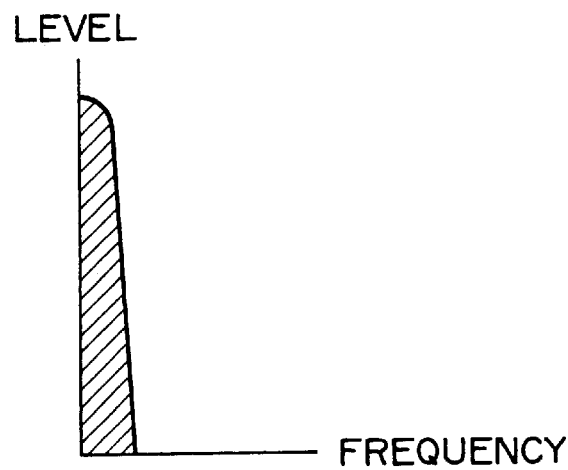
FIG. 6 is a diagram for describing the relation between the SS anti-duplication control signal and information signal in the form of spectrum.
Figure 6B:
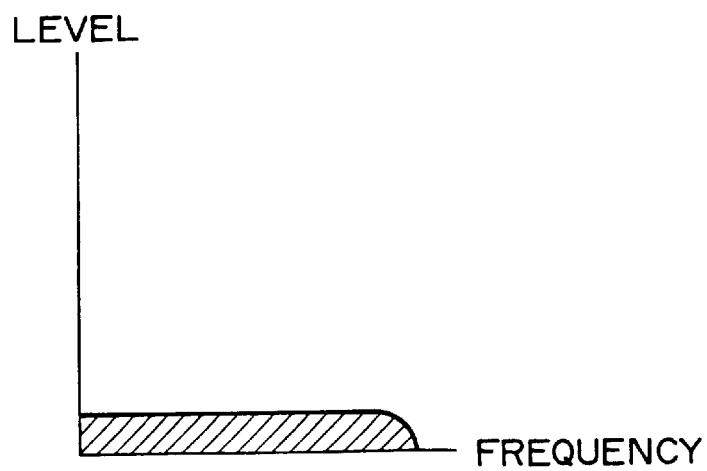
Figure 6C:
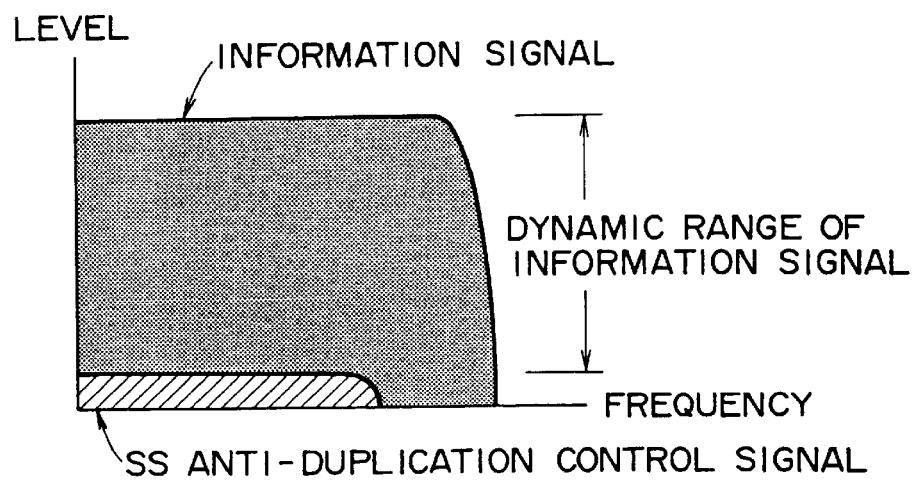

When the spectral spread signal or SS anti-duplication control signal S6A is superimposed on an information signal in the addition section 17, the SS anti-duplication control signal S6A is superimposed with a level smaller than that of the dynamic range of the video signal that is an information signal as shown in FIG. 6C. Such superimposition can prevents the main information signal from being deteriorated. Hence, when the video signal on which the SS anti-duplication control signal is superimposed is supplied to a monitor receiver to playback an image, the SS anti-duplication control signal does not affect adversely and a good playback image is obtained.

Figure 6D:
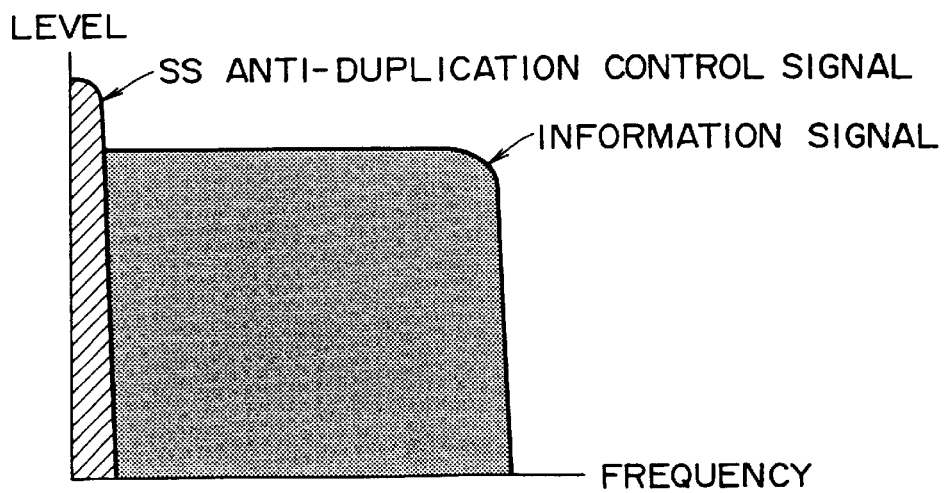

On the other hand, when inversion spectral spread is performed to detect the SS anti-duplication control signal in the recording side as described hereinafter, the SS anti-duplication control signal is restored again as a signal having a narrow band as shown in FIG. 6D. By giving a sufficient band enlargement ratio, the power of the anti-duplication control signal after inversion spreading exceeds that of the information signal, and it becomes possible to detect the anti-duplication control signal.

In this case, it is impossible to remove or alter the anti-duplication control signal by way of simple replacement of a frequency filter or information, because the SS anti-duplication control signal is superimposed on the analog video signal in the same time and same frequency as those of the analog video signal.

Therefore, the SS anti-duplication control signal superimposed on a video signal will not be removed, and the SS anti-duplication control signal is provided consistently to a device such as monitor receiver or recording device.

Next, the recording device 20 which receives supply of the video signal S7A from the above-mentioned output device 10 and records the video signal is described. The recording device 20 of this embodiment is provided with a coding section 21, sync separation section 22, PN code generation section 23, PN code inversion section 24, detection section 25 for detecting the spectrally spread anti-duplication control signal superimposed on the video signal (referred to as SS anti-duplication control signal detection section hereinafter), duplication control section 26 for controlling duplication control such as permission or inhibition, write section 27, and A/D conversion circuit 291 as shown in FIG. 2. The recording medium 200 is a DVD on which the video signal is written by the recording medium 20.

The video signal S7A supplied from the output device 10 is converted to a digital video signal S8 by the A/D conversion circuit 291 and the resultant signal is supplied to the coding section 21, sync separation section 22, and SS anti-duplication control signal detection section 25.

The coding section 21 receives supply of the digital video signal S8, and performs coding processing such as removal of the video sync signal and data compression of the digital video signal to generates a digital video signal S9 for supplying and recording on the recording medium 200, and the digital video signal S9 is supplied to the write section 27.

The sync separation section 22 extracts the video sync signal S11 from the digital video signal S8 before coding processing, and supplies it to the PN code generation section 23. In the recording device 20 of this embodiment, a vertical sync signal is used as the video sync signal S11 corresponding to the above-mentioned output device 10.

The PN code generation section 23 generates a PN code as the spread code based on the vertical sync signal S11, and generates various timing signals used by other processing sections.

FIG. 7 is a block diagram for illustrating the PN code generation section 23 of the recording device 20 of this embodiment, and FIG. 8 is a diagram for describing the PN code start timing signal T2, PN code inversion control signal VT2, and PN inversion code S12 generated by the PN code generation section 23.

As shown in FIG. 7, the PN code generation section 23 is provided with a PN code generation control section 231, PLL circuit 232, PN code generator 233, and timing signal generation section 234. Though the PN code generation section 23 is a section for generating the PN code string and various timing signal like the PN code generation section 15 of the above-mentioned output device 10 shown in FIG. 3, this section 23 is different from the PN code generation section 15 of the output device 10 in that the switch circuit SW1 is not provided.

The PN code generation control section 231 generates a PN code start timing signal T2 (FIG. 8B) which indicates timing for starting generation of a PN code string based on the vertical sync signal S11 (FIG. 8A). In this embodiment, the PN code start timing signal T2 is generated with reference to the front edge of the vertical sync signal S11. The PN code start timing signal T2 functions to start generation of PN code string which repeats every one vertical interval.

The PLL circuit 232 generates a clock signal CLK 2 with reference to the vertical sync signal S11 supplied to the PLL circuit 232, and supplies it to the PN code generator 233. The PLL circuit 232 of this embodiment generates a clock signal CLK 2 of, for example, frequency of 250 kHz like the PLL circuit 152 of the PN code generation section 15 of the above-mentioned output device 10.

The PN code generator 233 determines PN code generation start timing based on the PN code start timing signal T2, and generates a PN code corresponding to the clock signal CLK 2 and outputs it. Further, the PN code generator 233 has the same structure as that of the above-mentioned PN code generator 153 shown in FIG. 5.

The PN code generator 233 generates a PN code S12 using the PN code start timing signal T2 and clock signal CLK 2. Thereby, generation of the PN code string S12 is started at the same start timing as that of the PN code string S5 with respect to the video signal supplied to the recording device 20, which PN code string S5 is generated in the output device 10.

In this embodiment, the PN code string S12 is a string that is the PN code string of one period generated from the head every one vertical interval like the PN code string used for spectrally spreading the anti-duplication control signal in the above-mentioned output device 10.

The timing signal generation section 234 of the PN code generation section 23 generates a PN code inversion control signal VT2 (FIG. 8C) used in the PN code inversion section 24 and output it. As shown in FIG. 8C, in this embodiment, the PN code inversion control signal VT2 is a signal for inverting every one chip Tt.

As described herein above, the PN code string S12 and PN code inversion control signal VT2 generated in the PN code generation control section 23 are supplied to the PN code inversion section 24.

The PN code inversion section 24 inverts the polarity of the PN code string S12 supplied from the PN code generation section 23 every one chip based on the PN code inversion control signal VT2 to generates a PN inversion code S13 (FIG. 8D).

In detail, the PN code inversion section 24 outputs the supplied PN code string S12 as it is in the low level interval of the PN code inversion control signal VT2 which inverted every one chip, and on the other hand, in the high level interval of the PN code inversion control signal VT2, the PN code inversion section 24 inverts the polarity of the PN code of the immediately preceding chip.

As the result, as shown in FIG. 8D, the PN code corresponding to the low level interval of the PN code inversion control signal VT2 is outputted as it is, and on the other hand, the PN code corresponding to the high level interval of the PN code inversion control signal VT2 is outputted with the polarity opposite to that of the PN code of the immediately preceding low level interval (immediately preceding chip interval), and the PN inversion code S13 is thereby generated Herein the polarity inversion indicates inversion from a PN code of 1 to a PN code of −1 and inversion from a PN code of −1 to a PN code of 1. The generated PN inversion code 13 is supplied to the SS anti-duplication control signal detection section 25 as an inversion spreading PN code string S13 used for inversion spectral spreading.

The SS anti-duplication control signal detection section 25 functions as an inversion spectral spreading processing means, and the function allows the SS anti-duplication control signal detection section 25 to extract the spectrally spread anti-duplication control signal superimposed on the video signal S8 by performing inversion spectral spreading using the PN inversion code S13 as a reference signal, and the SS anti-duplication control signal detection section 25 supplies it to the duplication control section 26 as the anti-duplication control signal S14.

When inversion spectral spreading is performed in the SS anti-duplication control signal detection section as described hereinbefore, the video signal S8 containing the spectrally spread anti-duplication control signal is multiplied by the PN inversion code S13, and the result is integrated to extract the anti-duplication control signal superimposed on the video signal S8.

While inversion spectral spreading, the polarity of the video signal S8 is alternately inverted by multiplying the PN inversion code S13, as the result, the polarity of either chip interval on which the spectrally spread anti-duplication control signal is superimposed or adjacent chip interval on which the spectrally spread anti-duplication control signal is not superimposed is inverted.

The video signal is a correlative signal between adjacent video signal interval in the horizontal interval. For example, correlation of the video signal is high between adjacent pixels. Therefore, the video signal component having different polarity repeating every one adjacent chip interval is canceled and offset by integration during inverse spectral spreading. Thus, the anti-duplication control signal superimposed on the video signal is effectively extracted without adverse effect of high level video signals.

The anti-duplication control signal S14 extracted by the SS anti-duplication control signal detection section 25 as described herein above is supplied to the duplication control section 26.

The duplication control section 26 decodes the anti-duplication control signal S14 and judges whether the video signal S7A supplied to the recording device 20 is a duplication permit signal or a duplication inhibition signal. Based on the judgement result, the duplication control section 26 generates a write control signal S15 and supplies it to the write section 27 to perform duplication control of the video signal S9, thus the selection whether writing is permitted or not permitted is performed.

The write section 27 writes the video signal S9 on the recording medium 200 if the write control signal S15 is a signal for permitting writing, on the other hand, the write section 27 does not write the video signal S9 on the recording medium 200 if the write control signal S15 is a signal for inhibiting writing.

9 is a diagram for describing the PN code used as the spread code in the output device 10 and recording device 20 of the present invention.

Figure 9A:
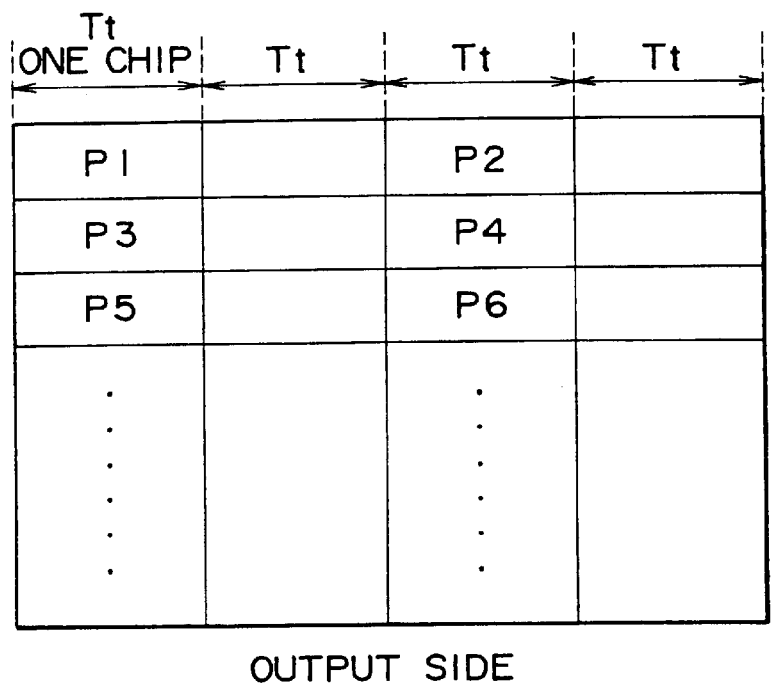
FIG. 9 is a diagram for describing the PN code used in the video signal output device and the PN code used in the video signal recording device of this embodiment.

In the output device of this embodiment, as shown in FIG. 9A, the anti-duplication control signal is spectrally spread using the PN code string S5 composed of PN code P1, P2, P3, . . . generated every second chip. In this case, the spectrally spread anti-duplication control signal is superimposed on the video signal every second chip and outputted.

Figure 9B:
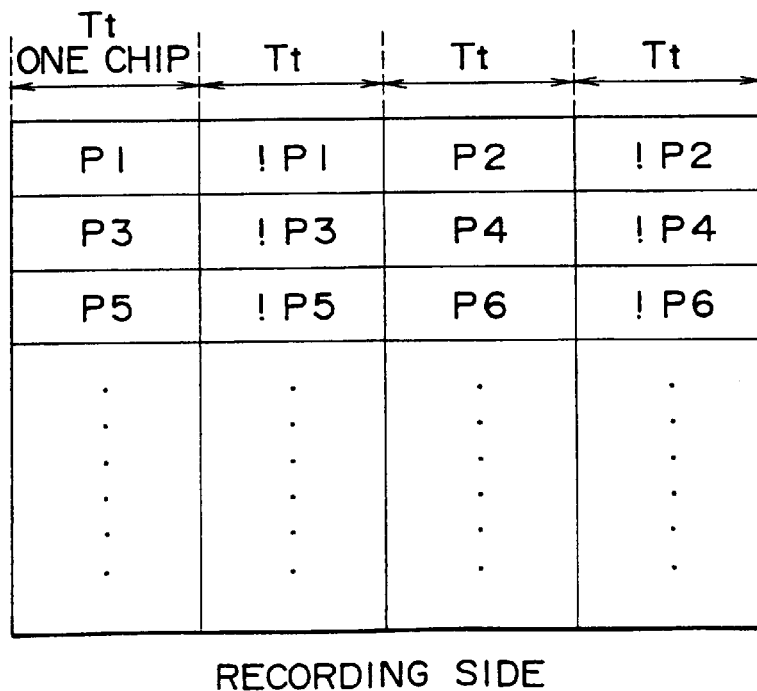

In the recording device 20, as shown in FIG. 9B, the PN code P1, P2, P3, . . . used for spectral spread in the output device 10 are generated every second chip corresponding to the video signal outputted from the output device 10, and the PN code ! P1, ! P2, ! P3, . . . having the polarity opposite to that of the PN code of the immediately preceding chip for the interval where the PN code is not generated every second chip in the output device are generated.

Herein, the symbol ! is referred to as "inverted" hereinafter. Accordingly, ! P1 represents a PN code having the opposite polarity to that of the PN code P1, and ! P2 represents a PN code having the opposite polarity to that of the PN code P2.

Hence in the recording device 20, as shown in FIG. 9B, the PN inversion code S13 having the same PN code as the PN code string S5 used for spectral spread corresponding to the chip interval on which the spectral spreading signal S6A is superimposed, and on the other hand, having the PN code having the polarity opposite to that of the PN code of the immediately preceding chip corresponding to the chip interval on which the spectral spreading signal is not superimposed is generated, and inversion spectral spread is performed using this PN inversion code.

Therefore, the same PN code string as the PN code string used for spectral spreading is multiplied for the chip interval on which the spectral spread code is superimposed in inversion spectral spreading, on the other hand, the PN code having opposite polarity to that of the same PN code string as used for spectrally spreading the anti-duplication control signal superimposed on the immediately preceding chip interval is multiplied for the chip interval on which the spectral spread signal is not superimposed, and the result is integrated.

In this case, the video signal component of adjacent chip intervals is canceled by integration during inversion spectral spreading, hence, only the anti-duplication control signal superimposed on the video signal as a spectral spread signal is extracted. The anti-duplication control signal superimposed on the video signal is extracted without adverse effect of high level video signals.

Hence, inversion spectral spread is performed correctly and rapidly, the detection efficiency of the anti-duplication control signal spectrally spread and superimposed on the video signal is improved, and spread gain of the anti-duplication control signal is reduced.

Further, in the video signal duplication control system comprising the output device 10 and recording device 20 of this embodiment, by starting generation of PN code string every one vertical interval based on the vertical sync signal, generation of the PN code string is started at the same timing with respect to the video signal in both the output device 10 and recording device 20.

As described hereinbefore, in the output device 10 of this embodiment, the PN code string is generated every second chip interval with reference to the front edge of the vertical sync signal (FIG. 10A) by using the PN code generation control signal VT which is inverted every one chip interval base on the generated PN code start timing signal T1 as shown in FIG. 10C. By spectrally spreading the anti-duplication control signal using this PN code, the anti-duplication control signal which is spectrally spread every second chip interval is superimposed on the video signal. However, the present invention is by no means limited to the above-mentioned case.

For example, as shown in FIG. 10D (¥6), the PN code is generated every third chip interval, and the spectrally spread anti-duplication control signal is superimposed every third chip interval on the video signal.

The PN code string used for spectral spread is by no means limited to generation every second chip interval and every third chip interval, but may be generated every integer multiple-th chip interval such as every fourth chip interval or every fifth chip interval.

In general, the video signal interval on which the anti-duplication control signal is superimposed and the video signal interval on which the anti-duplication control signal is not superimposed may be prescribed so that the video signal of both video signal intervals is sufficiently correlative to cancel the video signal of both video signal intervals by calculating the difference between the video signal in the video signal interval on which the spectrally spread anti-duplication control signal is superimposed and the video signal in the adjacent video signal interval on which the spectrally spread anti-duplication control signal is not superimposed.

Further, in the recording device 20 correspondingly to the output device 10, the same PN code as the PN code used for spectrally spreading the anti-duplication control signal in the output device is generated for the video signal interval on which the spectrally spread anti-duplication control signal is superimposed, on the other hand, the PN code having the opposite polarity to that of the PN code used for spectral spreading is generated for the video signal interval on which the spectrally spread anti-duplication control signal is not superimposed which video signal interval is adjacent to the video signal interval on which the spectrally spread anti-duplication control signal is superimposed.

The present invention is by no means limited to the case that the anti-duplication control signal spectrally spread every integer multiple-th of one chip interval is superimposed on the video signal, but the case that the anti-duplication control signal spectrally spread every second divided sub-interval formed by dividing one chip interval into a plurality of divided sub-intervals may be applied.

For example, as shown in 10E, one chip is divided into two by the PN code generation control signal VT for dividing one chip into two, and the spectrally spread anti-duplication control signal may be superimposed on the video signal every second ½ chip interval. Alternately, as shown in FIG. 10F, one chip is divided into four by the PN code generation control signal VT for dividing one chip into four, and the spectrally spread anti-duplication control signal may be superimposed on the video signal every second ¼ ship interval.

In the recording device 20, generation of the PN code is started at the same timing as that in the output device 10 with respect to the video signal correspondingly to the output device 20 as described herein above, and one chip interval of the generated PN code is divided into two or four.

Hence, as described herein above, the same PN code as the PN code used for spectral spread is generated for the divided sub-interval on which the spectrally spread anti-duplication control signal is superimposed, on the other hand, the PN code having the polarity opposite to that of the PN code used for spectrally spreading the anti-duplication control signal superimposed on the immediately preceding divided sub-interval is generated for the divided sub-interval on which the spectrally spread anti-duplication control signal is not superimposed adjacent to the divided sub-interval on which the spectrally spread anti-duplication control signal is superimposed.

In detail, in the case that one chip interval is divided into a plurality of divided sub-interval as described herein above, the polarity of the PN code may be inverted every one divided sub-interval in the recording device 20. For example, in the case that one chip is divided into two, the anti-duplication control signal is superimposed on the first divided interval, in the recording device 20, the PN code is generated at the same timing as that in the output device 10, and if the PN code is "1", then it is divided into two as "1, −1", and if the PN code is "−1", then it is divided into two as "−1, 1", and the polarity is inverted every ½ divided sub-interval.

Similarly, in the case that one chip is divided into four, in the recording device 20, the PN code is generated at the same timing as that in the output device 10, and if the PN code is "1", then it is divided into four as "1, −1, 1, −1", and if the PN code is "−1", then it is divided into four as "−1, 1, −1, 1", and the polarity is inverted every ¼ divided sub-interval.

In the case that one chip is divided into a plurality of divided sub-intervals, the number is by no means limited to two and four as described herein above, but one chip may be divided into a plurality of divided sub-intervals such as six divided sub-intervals or eight divided sub-intervals.

In the case that one chip is divided into a plurality of divided sub-intervals and the spectrally spread anti-duplication control signal is superimposed as described herein above, the video signal interval on which the anti-duplication control signal is superimposed and the adjacent video signal interval on which the anti-duplication control signal is not superimposed are located together within a narrower range, hence, correlation of the video signal between both video signal intervals becomes higher. Thus, the video signal component is canceled more efficiently by integration during inversion spectral spread.

In detail, one chip of the PN code corresponds to, for example, one pixel of the video signal or a plurality of pixels. In the case that one chip of the PN code corresponds to, for example, 8 pixels of the video signal and one chip is divided into two, a video signal interval corresponding to 4 pixels of the video signal is one interval. In this case, the spectrally spread anti-duplication control signal is superimposed every alternate four pixels.

Similarly, in the case that one chip of the PN code corresponds to 8 pixels of the video signal and one chip is divided into four, a video signal interval corresponding to two pixels of the video signal is one interval. In this case, the spectrally spread anti-duplication control signal is superimposed every alternate two pixels.

In the case that one chip PN code is divided into a plurality of divided sub-intervals as described herein above, the interval on which the anti-duplication control signal is superimposed and the interval on which the anti-duplication control signal is not superimposed are formed within a narrower range (in a shorter interval of the video signal), and correlation of the video signal between the interval on which the anti-duplication control signal is superimposed and the adjacent interval becomes higher. Therefore, the video signal is canceled more effectively between the video signal of the interval on which the anti-duplication control signal is superimposed and the video signal of the adjacent interval on which the anti-duplication control signal is not superimposed by integration during inversion spectral spread.

In the above-mentioned embodiment, in the output device 10 and recording device 20, the PN code string is generated at the timing synchronous with the vertical sync signal using the vertical sync signal as the reference signal, however, the reference signal is by no means limited to the vertical sync signal, and the horizontal sync signal may be used as the reference signal.

Further, in the output device 10 and recording device 20, the PN code string is generated at the same timing synchronous with the video sync signal using the same video sync signal as the reference signal as described herein above, thereby the PN code string is generated at the same timing with respect to the video sync signal respectively in the output device 10 and recording device 20.

Hence it is not necessary that, for example, the PN code string used for spectrally spreading the anti-duplication control signal superimposed on the video signal is detected by means of a sliding correlator and phase control is performed so that the PN code string for inversion spectral spread is generated at the same timing, and thus the anti-duplication control signal is extracted rapidly by way of inversion spectral spread.

[Second Embodiment]

Next, the second embodiment of the video signal duplication control system comprising a video signal output device and video signal recording device in accordance with the present invention will be described hereinafter.

In the second embodiment, by removing the video signal component before inversion spectral spreading is performed in the recording device, only the spectrally spread anti-duplication control signal component superimposed on the video signal is extracted, the resultant signal is subjected to inversion spectral spreading, thereby, the anti-duplication control signal superimposed on the video signal is extracted rapidly and correctly.

In the second embodiment, the same output device as the output device 10 used in the first embodiment described using FIG. 1 is used. Therefore, the output device 10 in the second embodiment spectrally spreads the anti-duplication control signal read out from the recording medium 100 using the PN code string generated every second chip, and superimposes the spectrally spread anti-duplication control signal on the video signal played back from the recording medium 100 every second chip interval, and out puts it. In this case, the PN code repeats every one vertical interval.

FIG. 11 is a block diagram for illustrating a recording device 30 used in the second embodiment. The recording device 30 receives a video signal outputted from the output device 10 used in this embodiment and records the video signal on the recording medium 200.

The recording medium 30 of the second embodiment is provided with a coding section 31, delay circuit 32, subtraction section 33, SS anti-duplication control signal detection section 34, sync separation section 35, PN code generation section 36, duplication control section 37, write section 38, and A/D conversion circuit 391 as shown in FIG. 11.

The video signal S7A supplied from the output device 10 is subjected to A/D conversion through the A/D conversion circuit 391, and the digital video signal S31 is supplied to the coding section 31, delay circuit 32, subtraction section 33, and sync separation section 35.

The coding section 31 receives the digital video signal S31, and then removes the sync signal and performs coding processing such as data compression of the digital video signal to generate a recording digital video signal S32, and supplies it to the write section 38 (¥9).

In the second embodiment, the delay circuit 32 delays the supplied digital video signal S31 by one chip and supplies it to the subtraction section 33. The subtraction section 33 subtracts the digital video signal S31 from the one chip-delayed digital video signal S31L outputted from the delay circuit 32 to output the spectrally spread anti-duplication control signal superimposed on the digital video signal.

In detail, on the video signal supplied from the output device 10, the anti-duplication control signal spectrally spread using the PN code generated every second chip as shown in FIG. 4D is superimposed every second chip. Hence, in this embodiment, first the video signal in the chip on which the anti-duplication control signal spectrally spread by delaying the video signal S31 by one chip by means of the delay circuit 32 is superimposed is supplied to the subtraction section 33 through the delay circuit 32.

When, to the subtraction section 33, the video signal of the vertical interval on which the spectrally spread anti-duplication control signal is not superimposed subsequent to the chip interval on which the spectrally spread anti-duplication control signal is superimposed is supplied from the A/D conversion circuit 391.

As described hereinbefore, the video signal is highly correlative between adjacent video signal intervals in the horizontal interval. Therefore, by subtracting the video signal of the chip interval on which the anti-duplication control signal is not superimposed from the video signal of the preceding chip interval on which the spectrally spread anti-duplication control signal is superimposed, the video signal component is offset, and the spectrally spread anti-duplication control signal component S33 is supplied every second chip to the SS anti-duplication control signal detection section 34.

However, in the case that the video signal delayed by one chip interval by means of the delay circuit 32 is subtracted from the video signal in the subsequent vertical interval successively, the video signal on which the spectrally spread anti-duplication control signal is superimposed is inevitably subtracted from the video signal on which the spectrally spread anti-duplication control signal is not superimposed. In this case, such subtraction is not preferable because the spectrally spread anti-duplication control signal component having the inverted polarity is inevitably calculated.

To cope with this problem, the delay circuit 32 of the second embodiment delays only the video signal of the chip interval on which the spectrally spread anti-duplication control signal is superimposed by one chip interval. In the subtraction section 33, the video signal component of the chip interval on which the anti-duplication control signal is superimposed is offset by the video signal component of the subsequent chip interval on which the anti-duplication control signal is not superimposed, and the video signal component is removed, then the spectrally spread anti-duplication control signal component is outputted every second chip.

On the other hand, receiving supply of the A/D converted video signal S31, the sync separation section 35 extracts the vertical sync signal S34 contained in the video signal S31 and supplies it to the PN code generation section 33.

The PN code generation section 33 has the same structure as the PN code generation section 23 of the recording device 20 described hereinbefore. The PN code generation section 33 of the second embodiment generates the same PN code string S35 as the PN code string S5 used for spectral spreading in the output device 10 corresponding to the clock signal generated based on the vertical sync signal S34 every one vertical interval with reference to the vertical sync signal S34. The PN code string S35 is supplied to the SS anti-duplication control signal detection section 34 as an inversion spreading PN code string.

By performing inversion spectral spreading on the spectrally spread anti-duplication control signal component S33 supplied from the subtraction section 33 using the inversion spreading PN code string S35, the SS anti-duplication control signal detection section 34 extracts the anti-duplication control signal S36 and supplies it to the duplication control section 37.

In this case, in view of delay of the first one chip on which the anti-duplication control signal is superimposed in the delay circuit 32, the SS anti-duplication control signal detection section 34 performs inversion spectral spread using the same PN code as the PN code used for spectral spread on the video signal of the chip interval carrying only the anti-duplication control signal as the result of removal of the video signal component to extract the anti-duplication control signal.

The duplication control section 37 generates the control signal S37 for controlling writing of the video signal S32 on the recording medium 200 depending on the anti-duplication control signal S36 like the duplication control section 26 of the recording device 20 described hereinbefore, and supplies it to the write section 38.

The write section 38 writes the video signal S32 on the recording medium 200 if the control signal S37 generated depending on the anti-duplication control signal S36 is a signal for indicating permission of writing, on the other hand, the write section 38 does not write the video signal S32 on the recording medium 200 if the control signal S37 is a signal for indicating inhibition of writing.

As described herein above, in the recording device 30 of the second embodiment, the anti-duplication control signal superimposed on the video signal can be extracted without adverse effect of high level video signal components like the above-mentioned first embodiment, because the video signal component in adjacent chip intervals which are highly correlative is removed. Thereby, inversion spectral spreading is performed correctly and rapidly, the detection efficiency of the spectrally spread anti-duplication control signal superimposed on the video signal is improved, and the spread gain of the anti-duplication control signal is reduced.

The output device 10 of the second embodiment may generate the PN code string used for spectral spreading every integral multiple-th of chip interval such as every second chip interval, every third chip interval, or every fourth chip interval.

In this case, in the recording device 30, the video signal to be supplied to the subtraction section 34 may be delayed by means of the delay circuit 33 by the video signal interval on which the video signal is superimposed correspondingly to the output device 10. Further, in this case, only the video signal of the video signal interval on which the anti-duplication control signal is superimposed may be delayed.

Further, in the output device 10 and recording device 30 of the second embodiment, the horizontal sync signal may be used as the reference signal instead of the vertical sync signal as in the output device 10 and recording device 20 in the first embodiment described hereinbefore.

As in the same manner as used in the above-mentioned first embodiment, for example, the anti-duplication control signal may be superimposed on the video signal every second ½ chip interval or ⅓ chip interval. In detail, one chip interval is divided into a plurality of divided sub-intervals, and the anti-duplication control signal spectrally spread every second divided sub-interval may be superimposed.

In this case, in the recording side, the difference between the video signal interval on which the spectrally spread anti-duplication control signal is superimposed and the interval corresponding to the video signal interval on which the anti-duplication control signal correlative to this video signal interval is not superimposed may be calculated.

In the above-mentioned embodiment, the PN code start timing signal T1 is generated with reference to the front edge of the video sync signal, however, by no mean limited to the case, the phase relation between respective signals may be deviated arbitrarily, for example, the position delayed by several clocks from the front edge of the video sync signal may be applied as the reference.

Further, in the above-mentioned embodiment, the case of the analog connection in which an analog video signal is supplied from the output device to the recording device is described for description, however, the present invention may be applied to the case of digital connection.

In other words, the spectrally spread anti-duplication control signal can be superimposed either on the analog video signal and on the digital video signal.

Further, in the recording device 20 and recording device 30, the video signal to be supplied to the SS anti-duplication control signal detection section is subjected to filtration previously, and only the low level video signal on which the spectrally spread anti-duplication control signal is superimposed is extracted, and then the extracted video signal may be supplied to the SS anti-duplication control signal detection section.

In the above-mentioned embodiment, the case that the output device 10 and recording device 20 are DVD devices is described, however, the present invention is by no means limited to the case, and it is possible to apply the present invention to the output device and recording device of a video disk and video CD. In other words, the present invention can be applied to either analog apparatus such as an analog VTR and digital apparatus such as a DVD device.

In the above-mentioned embodiment, the anti-duplication control signal added in the video signal recorded on the recording medium 100 is extracted, spectrally spread using the PN code, and superimposed on the video signal to be supplied to the recording device 20 or recording device 30, however, a recording medium having the recorded video signal on which the spectrally spread anti-duplication control signal was previously superimposed may be used.

In detail, for example, the anti-duplication control signal is spectrally spread using the PN code generated every second chip interval with respect to the video signal to be recorded on the recording medium and the spectrally spread anti-duplication control signal is superimposed on the video signal every second chip. A recording medium having the recorded video signal on which the anti-duplication control signal was superimposed every second chip interval is prepared.

In this case, by generating the PN code synchronous with the video sync signal, the PN code can be generated at the same timing as the PN code which spectrally spreads the anti-duplication control signal based in the video sync signal also in the recording device side.

In the case of the recording medium having the recorded video signal on which the spectrally spread anti-duplication control signal was previously superimposed as described herein above, it is not necessary to perform processing such as extraction of the anti-duplication control signal, generation of the PN code, spectral spread, and superimposition of the spectrally spread anti-duplication control signal on the video signal.

In the case of the recording medium having the recorded video signal on which the spectrally spread anti-duplication control signal was previously superimposed, the recording device side having the function to perform inversion spectral spread to extract the anti-duplication control signal can extract the anti-duplication control signal superimposed previously on the video signal and perform duplication control effectively.

Alternatively, an anti-duplication control signal generation section is provided to the output device, and the anti-duplication control signal generated in the output device is spectrally spread using the PN code string and superimposed on the video signal, and then outputted.

In this case, even if the anti-duplication control signal is not recorded originally on the recording medium or the spectrally spread anti-duplication control signal is not superimposed, duplication control is performed in the recording device side using the anti-duplication control signal which was generated in the output device and superimposed on the video signal.

In the above-mentioned embodiment, the case that the output device and recording device of DVD devices are used as the duplication prevention control device is described, the present invention is by no means limited to the case. For example, the present invention can be applied to the case of an output device for outputting television signals in a broadcasting station side in which the spectrally spread anti-duplication control signal is superimposed on the television signal to be transmitted and then the television signal is transmitted. In the receiving side, inversion spectral spread is performed to extract the anti-duplication control signal string superimposed on the video signal, and duplication prevention control of the video signal is performed based on the anti-duplication control signal.

Of course, the present invention can be applied to the output device and receiving device for video signal transmitted through a cable as in the case of cable television.

Further, in the above-mentioned first and second embodiments, the case that the anti-duplication control signal of the video signal is superimposed as the additional information is described, however, the present invention is by no means limited to the case.

For example, a copyright information which functions to identify copyright holder of the image to be played back from the video signal may be spectrally spread and superimposed on the video signal. In this case, because the copyright information superimposed on the video signal is extracted by inversion spectral spread and hence the copyright holder is recognized, the copyright information is useful for preventing the copyright from being pirated, and useful for warning the piracy in the case of use of an image of the copyright holder without permission.

Further, to eliminate the adverse effect of high level video signals when the additional information is extracted from the video signal on which the spectrally spread additional information is superimposed as described hereinbefore, it is considered as a method that the video signal on which the spectrally spread additional information, which video signal is the same video signal as that having the superimposed spectrally spread anti-duplication control signal, is not superimposed (original software) is recorded on a recording medium for preparation, and by subtracting the corresponding video signal on which the additional information is not superimposed from the video signal on which the additional information is superimposed, and the spectrally spread additional information superimposed on the video signal is extracted.

However, in this case, the original software should be prepared previously. Hence, if the original software is not available in hand, it is impossible to cancel the video signal component and extract only the spectrally spread additional information component.

On the other hand, according to the above-mentioned video signal output device and video signal recording device in accordance with the present invention, the additional information superimposed on the video signal can be extracted without adverse effect of the video signal without using the original software on which the additional information is not superimposed. Hence, the additional information superimposed on the video signal is extracted using a device to which the video signal reception device in accordance with the present invention having the function for extracting the additional information superimposed on the video signal is applied without using a device for calculating the difference between the video signal on which the spectrally spread additional information is superimposed and the video signal information as an original software recorded on another recording medium.

As described hereinbefore, according to the video signal transmission method, superimposed information extraction method, video signal output device, video signal recording device, and video signal recording medium in accordance with the present invention, the video signal is canceled between the video signal of the video signal interval on which the additional information is superimposed and the video signal of the adjacent video signal interval on which the additional information is not superimposed because of correlation in the horizontal scanning line direction of the video signal, and the spectrally spread additional information superimposed on the video signal can be extracted rapidly and correctly.

Thereby, the detection efficiency of the additional information superimposed on the video signal is improved and the spread gain during spectral spreading is reduced.

Further, generation of the spread code at the timing based on the video sync signal allows the video signal output side and receiving side to start generation of the spread code at the same timing as that of the video sync signal. Thus, inversion spectral spreading in the recording device can be performed rapidly.

What is claimed is:

1. A detecting device for detecting an additional information from a signal on which said additional information is superimposed intermittently with a predetermined timing using a first code, said detecting device comprising:

generating means for generating a second code for a first region of said signal on which said additional information is superimposed and for generating a third code having a polarity different from a polarity of said second code for a second region of said signal on which said additional information is not superimposed, wherein said first region and said second region are defined on the basis of N(N>1) chips of said first code; and detecting means for detecting said additional information superimposed on said signal using said second code relative to said first region of signal and using said third code relative to said second region of signal.

2. A detecting device for detecting an additional information from a signal on which said additional information is superimposed intermittently with predetermined timing using a first code, said detecting device comprising:

generating means for generating a second code for a first region of signal on which said additional information is superimposed and for generating a third code having a polarity different from a polarity of said second code for a second region of signal on which said additional information is not superimposed, wherein said first region and said second region are defined on the basis of a unit formed by dividing a chip of said first code use for superimposing into a plurality of said units; and detecting means for detecting said additional information superimposed on said signal using said second code relative to said first region of signal and using said third code relative to said second region of signal.

3. The detecting device as claimed in claim 1 or claim 2, wherein said detecting means detects said additional information superimposed on said signal by integrating results of a processing of said signal using said second code relative to said first region of signal and using said third code relative to said second region of signal.

4. The detecting device as claimed in claim 1 or claim 2, wherein said generating means generates said second code and said third code alternately.

5. The detecting device as claimed in claim 1 or claim 2, wherein said second code and said third code are a first spread code and a second spread code, respectively; and said detecting means detects said additional information superimposed on said signal by performing an inverse spreading process relative to said first region of signal using said first spread code and relative to said second region of signal using said second spread code.

6. The detecting device as claimed in claim 4, wherein said second code and said third code are a first spread spectrum code and a second spread code, respectively; and said detecting means detects said additional information superimposed on said signal by performing an inverse spread spectrum process relative to said first region of signal using said first spread spectrum code and relative to said second region of signal region of signal using said second spread spectrum code.

7. A detecting device for detecting an additional information from a signal on which said additional information is superimposed intermittently with a predetermined timing, said detecting device comprising:

determining means for determining a difference between a first region of said signal on which said additional information is superimposed and a second region of said signal on which said additional information is not superimposed, wherein said first region and said second region are defined on the basis of N(N>1) chips of a code; and detecting means for detecting said additional information superimposed on said signal using said difference determined by said determining means.

8. A detecting device for detecting an additional information from a signal on which said additional information is superimposed intermittently with a predetermined timing, said detecting device comprising:

determining means for determining a difference between a first region of said signal on which said additional information is superimposed and a second region of said signal on which said additional information is not superimposed, wherein said first region and said second region are defined on the basis of units formed by dividing a chip of a code used for superimposing into a plurality of said units; and detecting means for detecting said additional information superimposed on said signal by using said difference determined by said determining means.

9. The detecting device as claimed in claim 7 or claim 8, wherein said detecting means comprises, generating means for generating said code; and processing means for extracting said additional information using said code from said difference determined by said determining means.

10. The detecting device as claimed in claim 9, wherein, said generating means generates a spread code as said code; and said processing means extracts said additional information by performing an inverse spreading process on said difference determined by said determining means using said spread code.

11. A detecting device as claimed in claim 10, wherein said processing means extracts said additional information by performing an inverse spread spectrum process on said difference determined by said determining means using said spread code.

12. A detecting device for detecting an additional information from a signal on which said additional information is superimposed intermittently with a predetermined timing, said detecting device comprising:

generating means for generating a first code for a first region of said signal on which said additional information is superimposed, and for generating a second code for a second region of said signal on which said additional information is not superimposed, wherein said first region and said second region are defined on the basis of N(N>1) chips of said first code; and detecting means for detecting said additional information superimposed in said signal using said first code applied relative to said first region of signal and using said second code applied relative to said second region of signal.

13. A detecting device for detecting an additional information from a signal on which said additional information is superimposed intermittently with a predetermined timing, said detecting device comprising:

generating means for generating a first code for a first region of said signal on which said additional information is superimposed and for generating a second code for a second region of said signal on which said additional information is not superimposed, wherein said first region and said second region are defined on the basis of a unit formed by dividing a chip of said first code used for superimposing into a plurality of said units; and detecting means for detecting said additional information superimposed on said signal using said first code applied to said first region of signal and using said second code applied to said second region of signal.

14. A detecting device for detecting an additional information from a signal generated by superimposing said additional information intermittently with a predetermined timing on a signal, said detecting device comprising:

code generating means for generating a code; and detecting means for processing a first region of said signal on which said additional information is superimposed using said code for processing a second region of said signal on which said additional information is not superimposed using said code, and for detecting said additional information by integrating a result of said processing for said first region of said signal and a result of said processing for said second region of said signal, wherein said first region and said second region are defined on the basis of N(N>1)chips of said first code.

15. A detecting device for detecting an additional information from a signal generated by superimposing said additional information intermittently with a predetermined timing on a signal, said detecting device comprising:

code generating means for generating a code; and detecting means for processing a first region of said signal on which said additional information is superimposed using said code, for processing a second region of said signal on which said additional information is not superimposed using said code, and for detecting said additional information by integrating a result of said processing for said first region of said signal and a result of said processing for said second region of said signal, wherein said first region and said second region are defined on the basis of a unit formed by dividing a chip of said code used for superimposing into a plurality of said units.

* * * * *